United States Patent
Andersen et al.

(10) Patent No.: US 11,347,050 B2
(45) Date of Patent: May 31, 2022

(54) METHOD TO SEPARATE AN EMULSION IN A LIQUID LENS

(71) Applicant: CORNING INCORPORATED, Corning, NY (US)

(72) Inventors: Amy Renee Andersen, Santa Barbara, CA (US); Raymond Miller Karam, Santa Barbara, CA (US)

(73) Assignee: CORNING INCORPORATED, Corning, NY (US)

( * ) Notice: Subject to any disclaimer, the term of this patent is extended or adjusted under 35 U.S.C. 154(b) by 88 days.

(21) Appl. No.: 16/585,837

(22) Filed: Sep. 27, 2019

(65) Prior Publication Data

US 2020/0026064 A1     Jan. 23, 2020

Related U.S. Application Data

(62) Division of application No. 14/984,197, filed on Dec. 30, 2015, now Pat. No. 10,466,468.

(60) Provisional application No. 62/099,097, filed on Dec. 31, 2014.

(51) Int. Cl.
   *G02B 26/00*     (2006.01)
   *B01D 17/04*     (2006.01)
   *B01D 17/06*     (2006.01)
   *G02B 3/14*     (2006.01)

(52) U.S. Cl.
CPC ........... *G02B 26/005* (2013.01); *B01D 17/04* (2013.01); *B01D 17/06* (2013.01); *G02B 3/14* (2013.01)

(58) Field of Classification Search
CPC ........ G02B 26/005; G02B 3/14; B01D 17/04; B01D 17/06
See application file for complete search history.

(56) References Cited

U.S. PATENT DOCUMENTS

| | | |
|---|---|---|
| 6,369,954 B1 | 4/2002 | Berge et al. |
| 7,242,528 B2 | 7/2007 | Renders et al. |
| 7,251,392 B2 | 7/2007 | Kuiper et al. |
| 7,446,945 B2 | 11/2008 | Kuiper et al. |
| 7,545,575 B2 | 6/2009 | Hendriks et al. |
| 7,612,947 B2 | 11/2009 | Helwegen et al. |
| 7,616,737 B2 | 11/2009 | Kuiper et al. |
| 7,729,057 B2 | 6/2010 | Maillard et al. |

(Continued)

FOREIGN PATENT DOCUMENTS

| | | | | |
|---|---|---|---|---|
| CN | 101866026 A | * | 10/2010 | ............... G02B 3/14 |
| WO | WO-2005103768 A2 | * | 11/2005 | ........... G02B 26/005 |
| WO | 2011135044 A1 | | 11/2011 | |

*Primary Examiner* — Walter D. Griffin
*Assistant Examiner* — Cameron J Allen (57) ABSTRACT

Embodiments generally relate to systems and methods for separating an emulsion in a cavity of a device such as a liquid lens device. In one embodiment, the method comprises at least one of: applying a bias voltage to electrodes in the device, causing at least one of droplet migration, flattening of large droplets, and reduced droplet surface tension; applying an oscillating actuation voltage waveform comprising an actuation frequency to the electrodes, such that fluid pumping and turbulence is created within the device cavity; and applying an oscillating excitation voltage waveform comprising an excitation frequency to the electrodes, such that the varying electric field created by the oscillating voltage causes small droplets of the first liquid to coalesce.

19 Claims, 8 Drawing Sheets

(56) References Cited

U.S. PATENT DOCUMENTS

| | | |
|---|---|---|
| 7,780,874 B2 | 8/2010 | Liogier D'Ardhuy et al. |
| 7,808,717 B2 | 10/2010 | Kuiper et al. |
| 8,400,558 B2 | 3/2013 | Berge et al. |
| 8,922,901 B2 | 12/2014 | Karam et al. |
| 9,074,168 B2 | 7/2015 | Maillard et al. |
| 9,164,272 B2 | 10/2015 | Maillard et al. |
| 2007/0165159 A1 | 7/2007 | Lee et al. |
| 2008/0094725 A1 | 4/2008 | Weekamp |
| 2008/0204891 A1 | 8/2008 | Tallaron et al. |
| 2009/0009881 A1 | 1/2009 | Helwegen et al. |
| 2009/0185280 A1 | 7/2009 | Helwegen et al. |
| 2010/0295987 A1 | 11/2010 | Berge |
| 2015/0070779 A1 | 3/2015 | Karam et al. |
| 2015/0124311 A1 | 5/2015 | Berge et al. |
| 2015/0338637 A1 | 11/2015 | Burger et al. |

\* cited by examiner

METHOD TO SEPARATE AN EMULSION IN A LIQUID LENS

RELATED APPLICATIONS

This application is a divisional of U.S. patent application Ser. No. 14/984,197 filed Dec. 30, 2015, which claims priority from U.S. Provisional Patent Application Ser. No. 62/099,097, entitled "Method to remove emulsion in a liquid lens", filed on Dec. 31, 2014, each of which is hereby incorporated by reference as if set forth in full in this application for all purposes.

BACKGROUND

An emulsion is defined as a fine dispersion of minute droplets of a first liquid in a second liquid in which the first liquid is not soluble or miscible. The emulsion can occur by vigorous mixing or shaking of the liquid mixture. A liquid lens (such as those produced by Optilux of Santa Barbara, Calif.) is created by enclosing two fluids with an engineered index of refraction difference within a housing. The housing incorporates electrodes which manipulate the shape of the lens based on the principles of electro-wetting. In the case of a liquid lens, an emulsion of the fluids in undesirable as it will negatively impact the optical performance of the lens. This can occur if the lens is subject to shock loads, such as caused by an impact due to dropping the device.

Methods by which an emulsion of two fluids may be "demulsified" or separated back into its two fluid constituents are known in fields such as the oil/gas industry. For example, a centrifuge can be used to separate the two fluids based on differences in their density. Another prior art method to separate an emulsion is to use chemicals that affect the surface tension of the fluids. Yet another method involves using electric fields to induce coalescence of the droplets of one fluid. However, there is no known prior art that specifically addresses the problem of an emulsion in a liquid lens cavity, and in particular an emulsion caused by severe shock loading of a liquid lens device including such a cavity.

The need therefore exists for methods and systems specifically tailored to clear or remove an emulsion from the field of view of a liquid lens. Ideally the clearing would occur very quickly (in less than 10 seconds, for example) without the need for deliberate user input or the involvement of devices external to the liquid lens system. The clearing could occur automatically during power up, or may be initiated in response to a signal from a sensor.

SUMMARY

The present invention includes a method for separating an emulsion comprising droplets of a first liquid suspended in a second liquid within a cavity of a liquid lens device. The method comprises at least one of: applying a bias voltage to electrodes in the liquid lens device, causing at least one of droplet migration, flattening of large droplets, and reduced droplet surface tension; applying an oscillating actuation voltage waveform comprising an actuation frequency to the electrodes, such that fluid pumping and turbulence is created within the liquid lens cavity; and applying an oscillating excitation voltage waveform comprising an excitation frequency to the electrodes, such that the varying electric field created by the oscillating voltage causes small is droplets of the first liquid to coalesce.

In one aspect, the bias voltage applied to the electrodes encourages migration of the first liquid towards one side of the liquid lens cavity and migration of the second liquid towards an oppositely situated side of the liquid lens.

In one aspect, the excitation and oscillating actuation waveforms are applied, and the actuation frequency is lower than the excitation frequency.

DETAILED DESCRIPTION

The manner in which the present invention provides its advantages can be more easily understood with reference to FIGS. 1 through 8.

Figure 1:
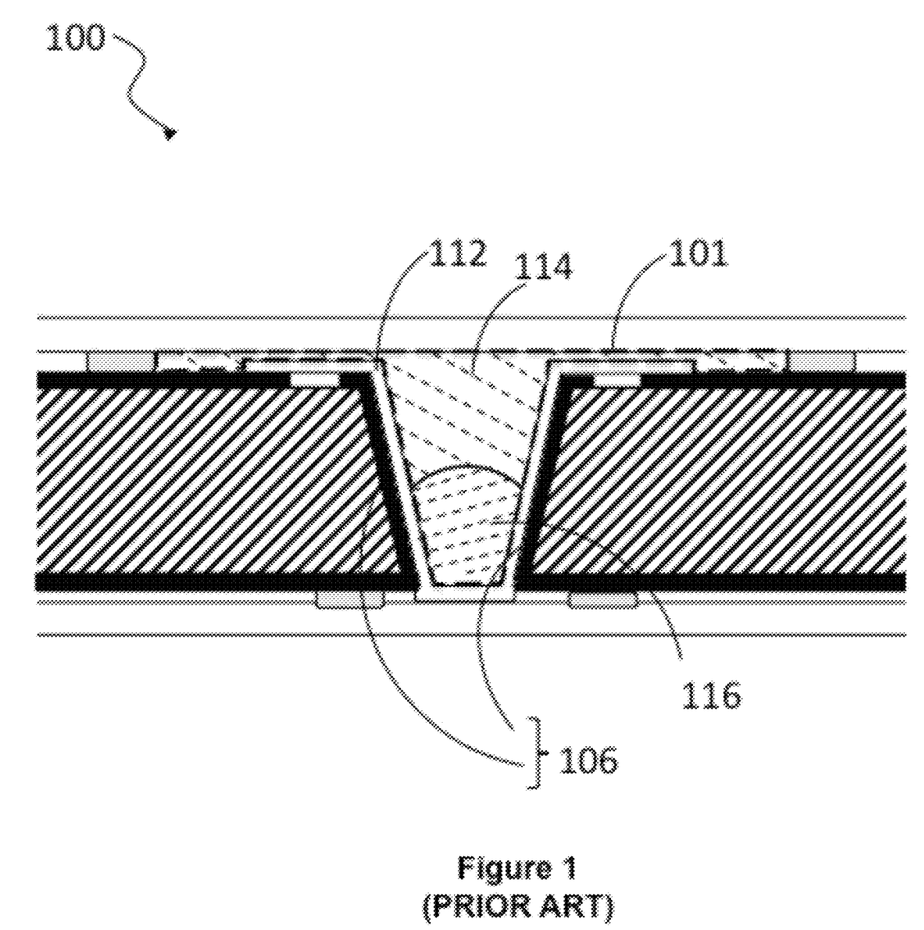
FIG. 1 is a schematic cross sectional view of a prior art liquid lens that may be operated on according to one embodiment.

FIG. 1 is a schematic cross sectional view of a prior art liquid lens 100 that may benefit by being operated on according to embodiments of the present invention. Liquid lens cavity 101 contains polar liquid 114 and non-polar liquid 116. Liquids 114 and 116 are chosen to be non-miscible and of different refractive indices, but of similar specific gravity, as required for liquid lens functionality. They may, for example, comprise an aqueous component and an oil component respectively. The base and top plates bounding lens cavity 101 are transparent, at least in their central regions directly underlying and overlying the cavity, at the wavelength of intended operation of the liquid lens. A layer of insulating material 112 lies on the side walls of cavity 101 on top of electrodes 106.

Figure 2:
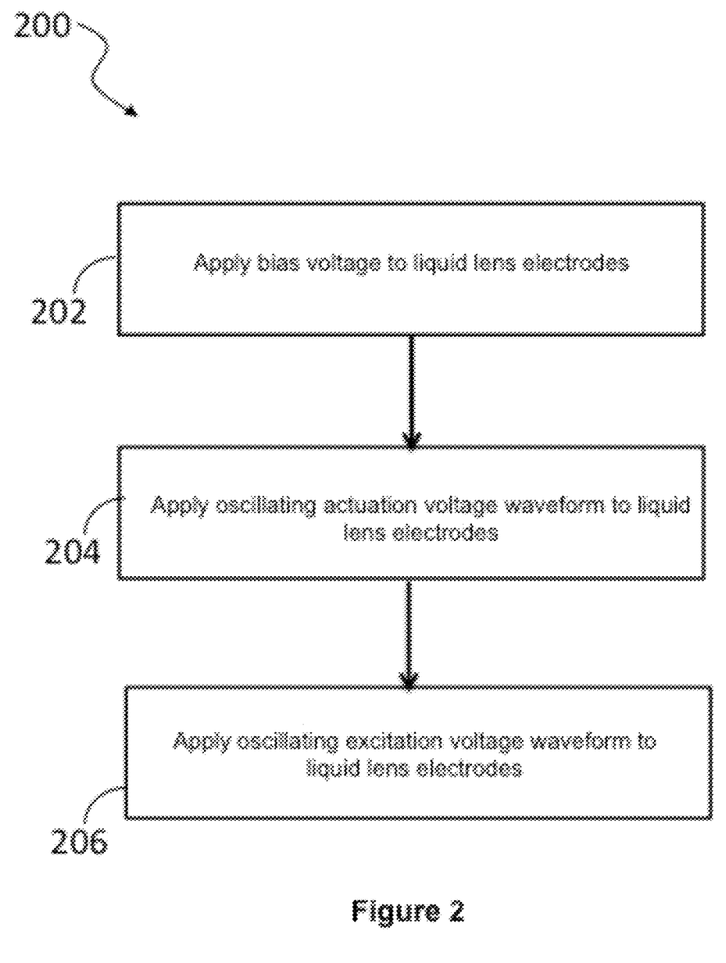
FIG. 2 is a flowchart of a method for removing an emulsion in a liquid lens according to one embodiment.

FIG. 2 is a flowchart illustrating one embodiment of a method 200 for carrying out the present invention. The illustrated embodiment shows three steps, 202, 204, 206, but it should be noted that first, any one or two of the steps may be omitted, and second, the order in which the steps are shown is arbitrary. In some embodiments, any two or all three steps may be carried out simultaneously.

At step 202, a bias voltage is applied to electrodes of the liquid lens. Typically, this will be a simple DC voltage applied across the same electrodes 106 used to actuate the liquid lens in its normal, focusing applications, independent of any shock event. At step 204, an oscillating actuation voltage waveform is applied to liquid lens actuation electrodes 106. At step 206, an excitation voltage waveform is applied to liquid lens electrodes. Again, this will typically be the same electrodes 106 used to actuate the liquid lens in its normal, focusing applications.

Consider some of the cases of interest to the present invention, where shock has caused an emulsion to form within cavity 101, meaning that droplets of one of liquids 114 and 116 are suspended in the other liquid, and then one or more of the three voltage waveforms is applied.

The application of a bias voltage may induce or facilitate migration of the droplets by virtue of its effect on polar liquid 114, which in turn affects the spatial positioning of liquid 116.

Such migration may in itself clear the useful optical path of the liquid lens, even if the emulsion is not completely removed. In addition, the application of the bias voltage creates a DC electric field that may cause larger droplets to flatten and/or reduce their surface tension, This in turn encourages their merging or coalescence into even larger drops, which is very beneficial to the goal of demulsification, as described below.

Independently of whether a bias voltage is applied, the application of an oscillating actuation voltage waveform will cause the shape of the meniscus to change in a periodic manner, via normal electro-wetting processes, physically moving the droplets in a pumping manner.

Collisions of these moving droplets with each other encourages coalescence. Pumping can create turbulence and motivate larger drop mixing as well as release of droplets adhered to the wall of the lens cavity, which in turn can coalesce. Collisions with the cavity walls can also encourage coalescence and migration.

Independently of whether either the bias voltage or the actuation voltage waveforms are applied, the application of an oscillating excitation voltage waveform will cause the droplets to combine based on the principles of electro-coalescence and electro-wetting. Under the force of the electric field the suspended droplets merge together, or coalesce, to form larger droplets. The process continues as larger and larger droplets are formed, until ultimately there is preferably a single predominant droplet (i.e. complete separation of the fluids).

In some embodiments, all three of the voltage types described above are applied at to substantially the same time, to achieve the goal of combining all droplets as quickly and efficiently as possible.

In some embodiments, droplet migration can be aided by affinity between the liquid in the droplets to the surfaces of the lens cavity. The surfaces of the lens cavity can be hydrophobic or is hydrophilic, either naturally, by virtue of the bulk material from which the liquid lens is fabricated, or by addition of a coating, which would attract or repel the polar fluid. Conversely, the surface can be oliophobic or oliophilic, which would attract or repel the non-polar fluid respectively. These surface properties can be used to aid in separation of the emulsion, as the liquid lens is subject to the oscillating voltage for example by using an hydrophilic coating on the surface near one electrode and an oliophilic coating on the surface near an opposing electrode. In some embodiments, the affinity coating may be the same electrically insulating coating 112 overlying an electrode 106. In some embodiments, the affinity coating may be an additional coating layer deposited over coating 112.

Figure 3:
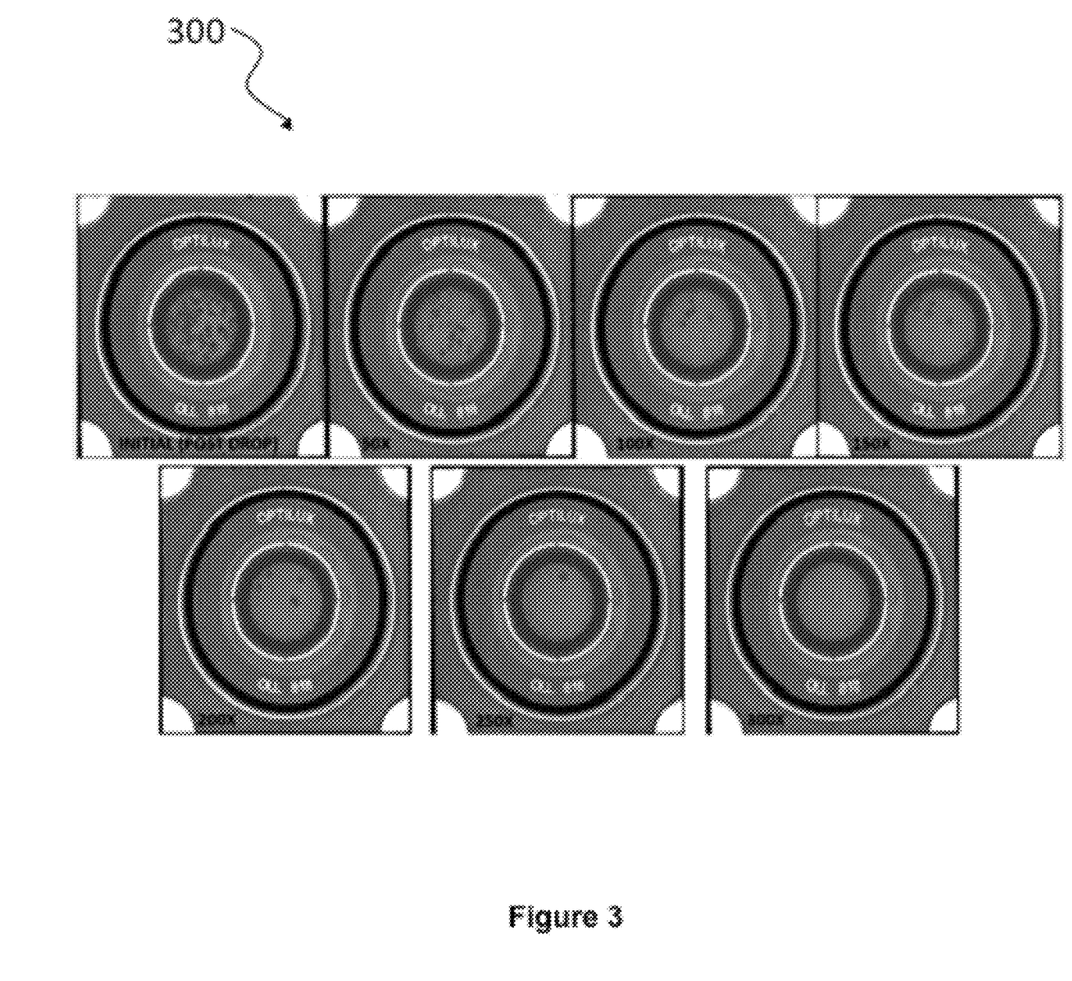
FIG. 3 illustrates sequential top-down views of a liquid lens in which an emulsion, clearly visible in the top left view, is gradually separated to provide a clear liquid lens in the bottom right view, according to one embodiment.

FIG. 3 shows a sequence of seven top-down views of an actual experimental liquid lens in which an emulsion, clearly visible in the top left view, is gradually separated (viewing images from left to right in the top row and then in the bottom row) to provide a clear liquid lens in the bottom right view, according to one embodiment. The first image, the top left view, shows a large number of droplets, seen as dark circles against a lighter background. The optical performance of the lens would obviously be very badly impacted by the presence of these droplets. However, applying a method of the present invention to the lens results in a dramatic reduction in the number of droplets, especially the smaller droplets, over time, until in the final view, no droplets are seen at all. The time taken to achieve such clearing of an emulsion can be as short as a few seconds or a few minutes at most, as the liquids respond to applied voltages within I Os of milliseconds.

Figure 4A:
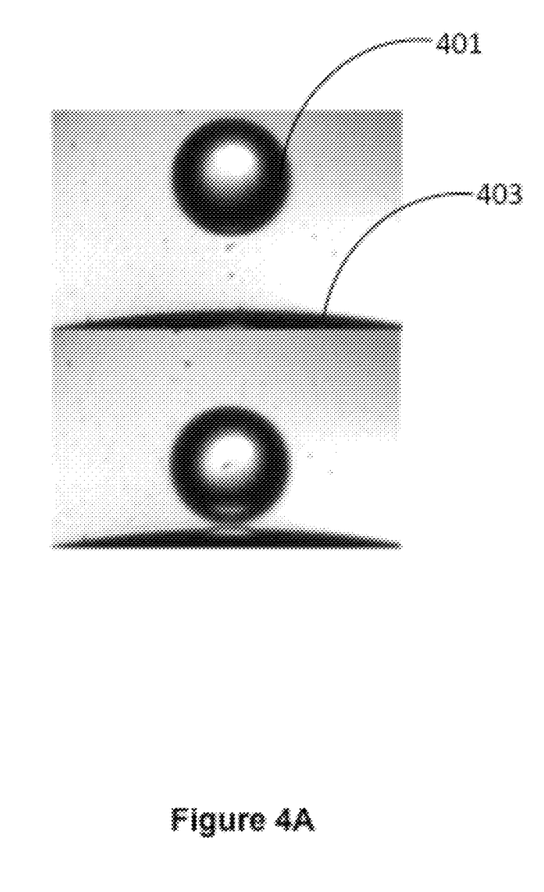
FIG. 4A illustrates side view images of the early stages of droplet coalescence according to one embodiment.
Figure 4B:
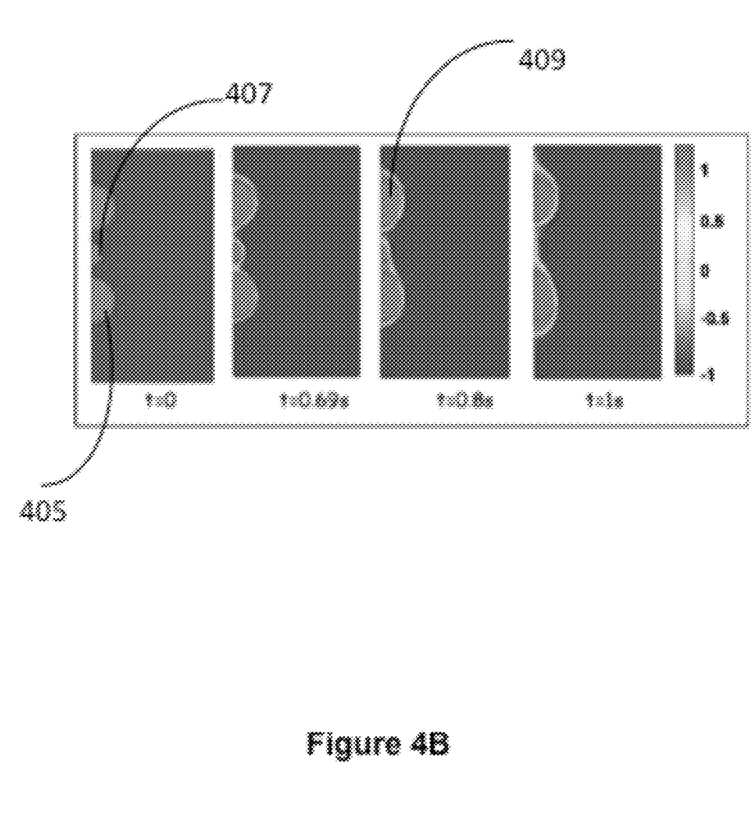
FIG. 4B illustrates side view images showing coalescence of two out of three droplets according to one embodiment.

FIGS. 4A and 4B illustrate coalescence events in two different cases. In FIG. 4A, the smaller drop is shown (above) approaching the much larger drop, only a portion of whose surface is shown, and then (below) as it is about merge into that larger drop. In FIG. 4B, from left to right, two larger drops are shown distorting towards the smaller drop positioned between them, until the lower larger drop coalesces completely with that smaller drop, although remaining separate from the other large drop. It should be noted that the relatively low surface tension of larger versus smaller drops leads to the tendency of the former to distort and merge with the latter. When two smaller drops come into contact, the requirement that the relatively high surface tension of either one be overcome makes coalescence events less likely.

In the present invention, the application of a DC field may be helpful in directly or indirectly encouraging the flattening or other distortion of droplets, making coalescence events more likely.

Figure 5:
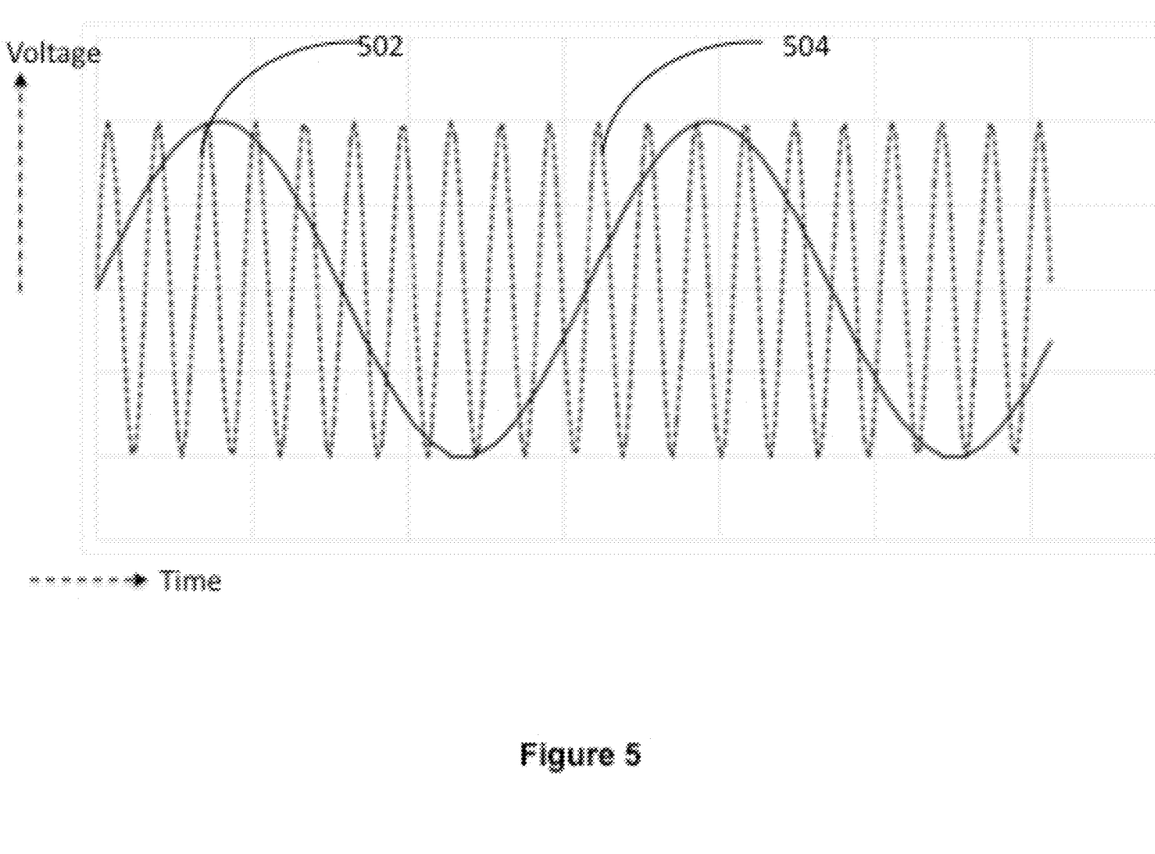
FIG. 5 illustrates excitation and actuation voltage waveforms according to one embodiment.

A typical frequency for an actuation waveform is 50 Hz, while a typical waveform for an excitation waveform is 100 Hz, but the values chosen for any given device may be determined according to the size of the lens cavity and the particular liquids that are used. FIG. 5 illustrates sinusoidal actuation voltage waveform 502 and excitation voltage waveform 504 for one exemplary device, where the frequency of the latter is approximately 10× the frequency of the former.

Figure 6:
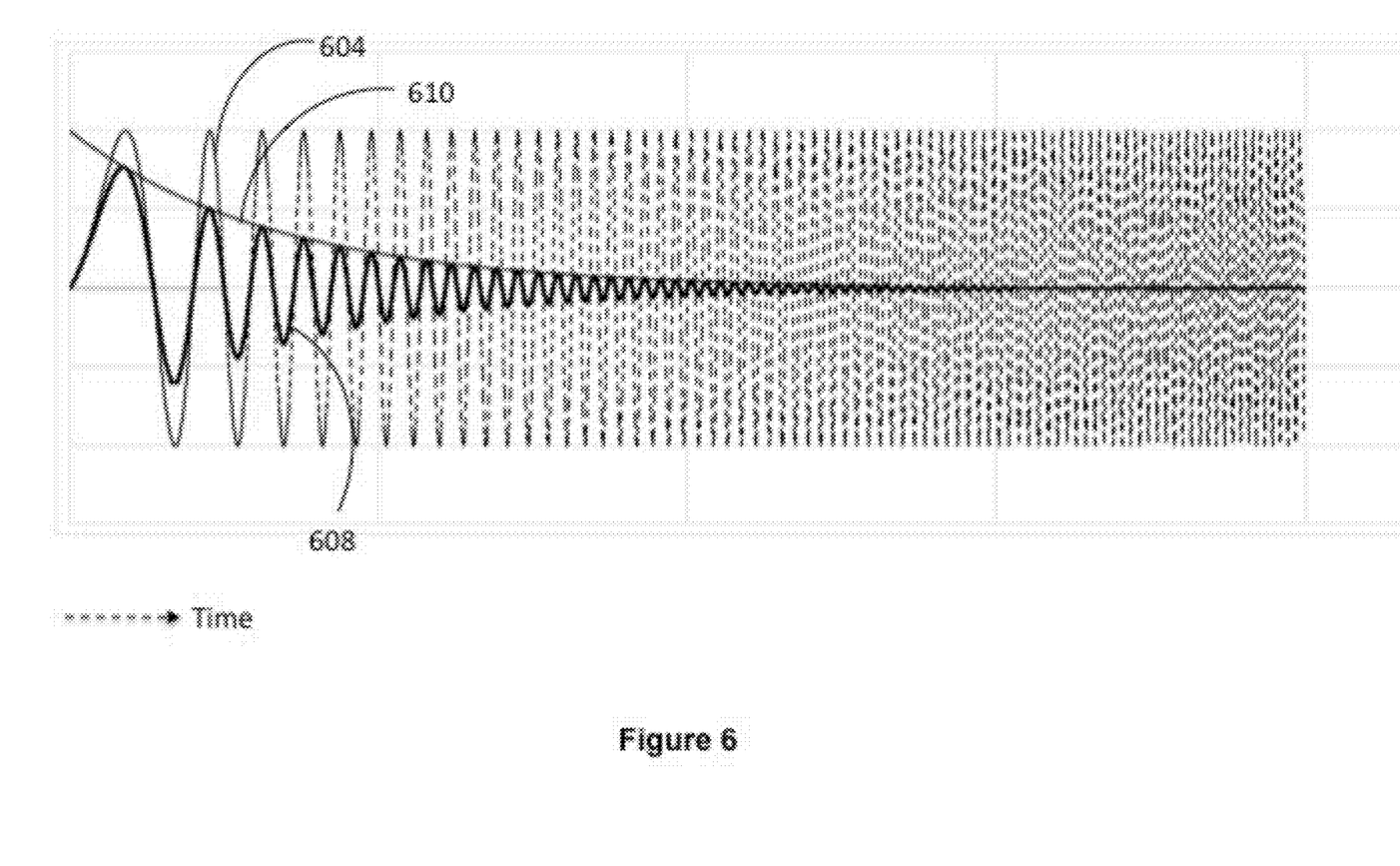
FIG. 6 illustrates a swept sine excitation voltage waveform and a liquid lens response according to one embodiment.

In general, the frequency or frequency band of the oscillating excitation waveform, their constancy or variability, and the resulting detailed shape are tuned or tailored to stimulate electro-coalescence according to the droplet size of the emulsification and the specific two-liquid combination used in the liquid lens. The voltage excitation signal may be a sine, square, triangle, or saw-tooth shape or intermixed combinations thereof. The frequency may be constant, and preferably in the range 1 Hz to 1000 Hz. In other cases, the frequency can vary, for example following a swept sine function 604, as shown in FIG. 6. As the frequency of the swept sine function increases, the liquid lens acts as a filter as in a LRC circuit, illustrated by curve 608. The liquid lens thus has a decaying amplitude response as shown by the envelope 610, which can result in a DC voltage if the frequency is specified high enough. In the case shown, where the sine function is centered on zero volts, the final DC voltage would actually be zero.

Figure 7:
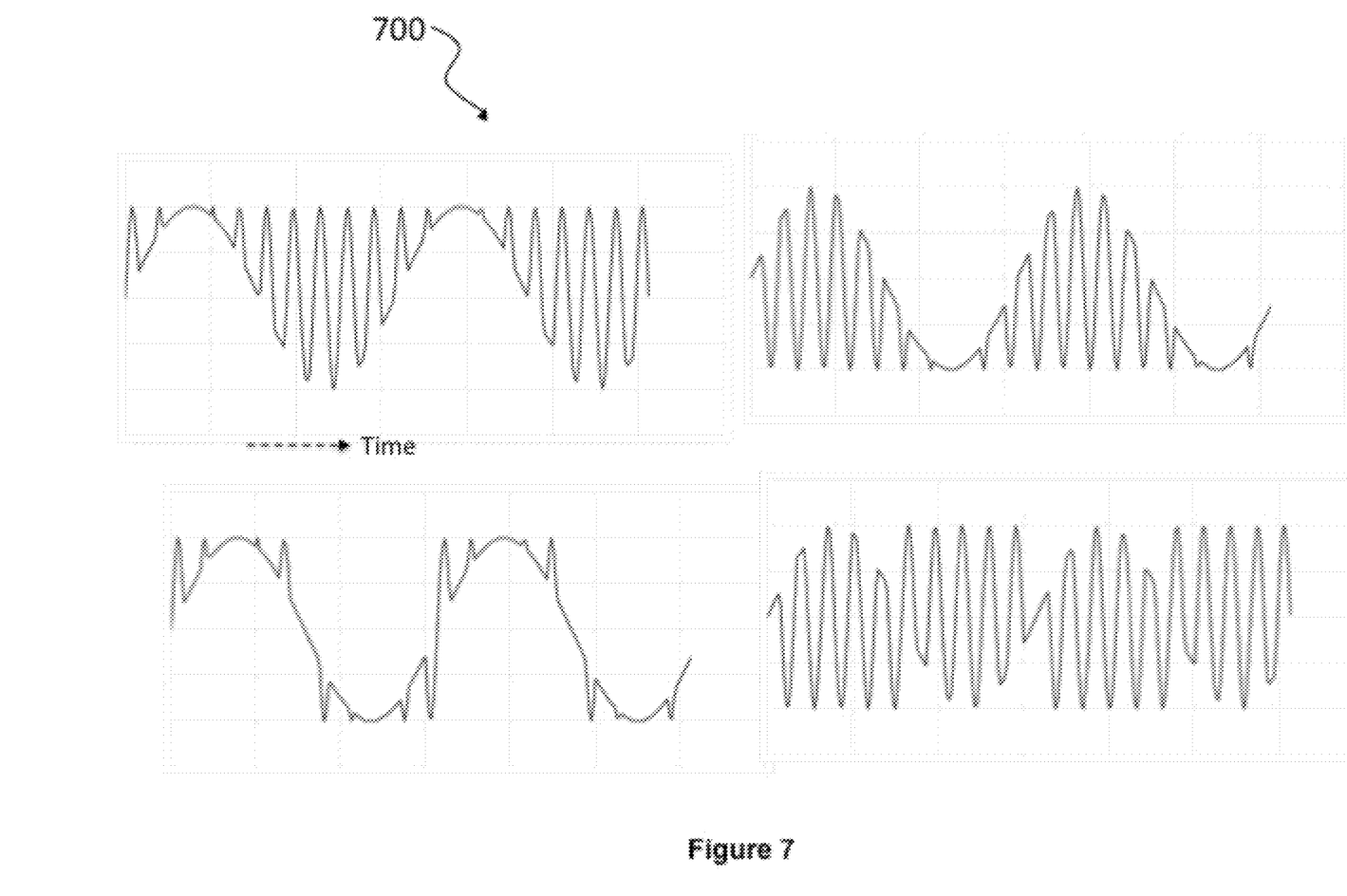
FIG. 7 illustrates four possible combinations of excitation and actuation voltage waveforms according to some embodiments.

In some embodiments, the actuation waveform applied to the liquid lens cycles from minimum voltage (Vmin) to maximum voltage (Vmax) at a period required for the lens to settle near each end of its operating range. This waveform moves the lens meniscus through a desired range of focus and/or through a desired range of fluidic tilt, thereby physically moving the liquids in the lens cavity and encouraging drop-to-drop contact and coalescence. The frequency of this actuation waveform is typically in the range 20 to 200 Hz, corresponding to a settling time of 50 to 5 ms for focus actuation. The higher frequency excitation waveform superimposed on the actuation voltage waveform operates too quickly to cause meniscus movement, operating instead on the droplets of the emulsion, stimulating smaller droplets within the emulsion to agglomerate or move toward the bulk fluid interface. The frequency of this higher frequency signal may be in a range of 2× to 100× that of the lens actuation signal, and preferably sweep through a range of frequencies. Four options for combining or superimposing the actuation and excitation signals are shown in FIG. 7.

In some embodiments, the liquid lens can be actuated in tilt. Electrodes positioned at opposite sides of the lens cavity are actuated at differing voltages to cause the meniscus to tilt. The tilt actuation can be a back and forth tilt, along the positive and negative direction of any axis or it may oscillate around the vertical axis of symmetry through the lens center, like the rotation of a clock hand around the 360 degree azimuth of the lens. This tilting actuation can be used independently or in addition to the focus actuation to stimulate coalescence in the liquid lens.

Figure 8:
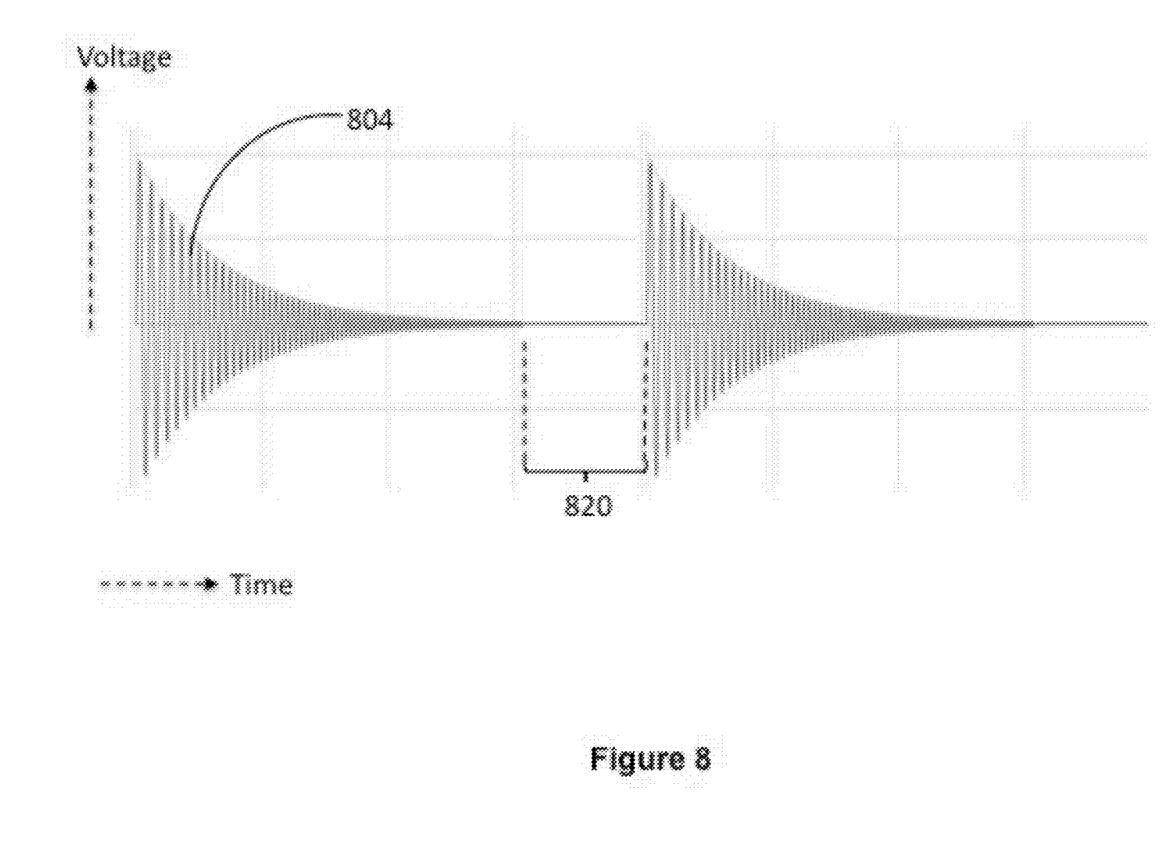
FIG. 8 illustrates an excitation voltage waveform including a dwell time according to one embodiment.

A further aspect of the novel method proposed here for a liquid lens is the option of incorporating a dwell time at prescribed intervals during the voltage excitation process. This dwell time, during which the excitation voltage is held at a constant value, enhances the coalescence process by allowing time for the droplets to build electrical charge and change shape before being subjected to the next cycle. In one embodiment taking advantage of this aspect, every set of 5 cycles of the actuation waveform plus swept sine function excitation waveform is followed by a dwell time of 10 ms at Vmax, before the next set of 5 cycles is applied. FIG. 8 shows another example of an electrical excitation waveform 804 incorporating a dwell time 820 after each cycle of the sweep.

Advantages of the present invention over demulsification approaches described in prior art include the ability to achieve rapid separation with much lower electric fields (35V/m has been found to work well, in comparison to the several hundred V/mm reported in the literature) avoidance of shorting issues (because liquid lenses are designed to include a dielectric coating covering the electrodes), and the absence of particles or other debris that often hamper electro-coalescence in other applications (because pure liquids are used in liquid lenses).

A typical design choice for electrowetting lenses is to match the densities of the two liquids well within the anticipated use or storage range to eliminate any effects of gravity or accelerations on the optical performance of the lens. However, this actually counters the ability of an emulsified lens to coalesce on its own over time by the natural settling effect of gravity. A further aspect of this invention involves matching liquid densities at the higher end of the use or storage temperature range of the product to prevent emulsification and aid the coalescing effect of the applied voltage waveforms. Elevated temperature reduces the viscosity thereby increasing the height of the capillary waves that can cause break off of droplets leading to an emulsion. By matching the densities at elevated temperatures, the motivation for the fluids to emulsify is greatly reduced as predicted by the Bond number. At lower temperatures, where the viscosity is higher, the densities can diverge a bit more because electro-coalescence is more efficient when the densities diverge.

The methods of demulsification discussed above may be applied when needed, after emulsification has occurred, but may also be applied automatically, without regard to any specific event causing emulsification. They may, for example, be carried out as a routine process during powering up of the liquid lens device.

In some embodiments, the methods of demulsification discussed above may be applied during a shock event or in anticipation of such an event. In either case, an acceleration sensor may be used to anticipate an impending shock force, for example a fall, and the voltage would then be applied in response to the sensor signal. This is analogous to shock protection used in the hard disk drive industry to prevent damage to the disk head or magnetic platens.

A further aspect of the present invention is the possibility of preventing an emulsion from forming by applying a voltage determined by a control algorithm to an un-emulsified liquid lens. In this case, a voltage may be applied to the liquid lens to apply a force to the liquids that reduces their tendency to separate. For example, a specific voltage may be used to minimize the length of the meniscus and thereby lower the characteristic length parameter in the Bond number.

The present invention is also applicable to Lab-On-Chip (LOC) applications. Electro-coalescence is known to be a useful method of achieving mixing in microfluidic channels. The principles of electro-coalescence and electro-wetting can be applied in combination as disclosed above, and used to demulsify fluids or combine droplets in LOC applications. In particular, liquid beads on a plate can be submersed in water or other suitable fluid and then physically moved using the principles of electro-wetting via on-chip conductive electrodes. The motion in coordination with the varying electric signals as described here can be used to enhance droplet coalescence.

Embodiments described herein provide various benefits. In particular, embodiments provide for the rapid and efficient separation of an emulsion in a liquid lens device into its component liquids, restoring the optical clarity of the lens. Some embodiments carry out the separation during or in anticipation of a shock event tending to cause emulsification. Some embodiments aim to prevent the formation of emulsions.

The above-described embodiments should be considered as examples of the present invention, rather than as limiting the scope of the invention. Various modifications of the above-described embodiments of the present invention will become apparent to those skilled in the art from the foregoing description and accompanying drawings. Accordingly, the present invention is to be limited solely by the scope of the following claims.

The invention claimed is:

1. A method for reducing emulsification occurring in a liquid lens device comprising a first liquid, a second liquid, and a meniscus disposed between the first liquid and the second liquid, the method comprising:
depositing the first liquid in a cavity of the liquid lens device;
depositing the second liquid in the cavity of the liquid lens device, wherein the meniscus separates the first liquid and the second liquid;
wherein the first liquid and the second liquid have substantially matched densities at a predetermined temperature that is different from a temperature at which the liquid lens device is typically used, and wherein a motivation for the first liquid and the second liquid to emulsify is reduced at the temperature at which the liquid lens device is typically used compared to the predetermined temperature.

2. The method of claim 1, wherein the predetermined temperature is a maximum temperature at which the liquid lens is intended to be used.

3. The method of claim 1, wherein the predetermined temperature is a maximum temperature at which the liquid lens is intended to be stored.

4. The method of claim 1, wherein the first liquid and the second liquid have substantially mismatched densities at the temperature at which the liquid lens device is typically used.

5. The method of claim 1, wherein:
the first liquid has a lower viscosity at the predetermined temperature than at the temperature at which the liquid lens device is typically used; and
the second liquid has a lower viscosity at the predetermined temperature than at the temperature at which the liquid lens device is typically used.

6. A method for reducing emulsification occurring in response to a shock event in a liquid lens device comprising a first liquid and a second liquid, wherein a focusing operation of the liquid lens device comprises applying a voltage waveform, the method comprising:
applying an anti-shock voltage derived by a control algorithm to electrodes in the liquid lens device, wherein the anti-shock voltage reduces a length of a meniscus between the first liquid and the second liquid; and
wherein the anti-shock voltage is applied independently of the voltage waveform applied to focus the liquid lens device.

7. The method of claim 6, wherein the anti-shock voltage is applied during the shock event.

8. The method of claim 6, wherein the anti-shock voltage is applied in response to a signal received from a sensor that anticipates the shock event likely to be experienced by the liquid lens device.

9. The method of claim 8, wherein the sensor is an acceleration sensor.

10. A liquid lens device comprising:
a first liquid disposed in a cavity;
a second liquid disposed in the cavity; and
a meniscus disposed between the first liquid and the second liquid;
wherein a density of the first liquid and a density of the second liquid are substantially matched at a higher temperature near a maximum of a use or storage temperature range; and
wherein the density of the first liquid and the density of the second liquid are not substantially matched at a lower temperature near a minimum of the use or storage temperature range.

11. The liquid lens device of claim 10, wherein:
a viscosity of the first liquid is lower at the higher temperature than at the lower temperature; and
a viscosity of the second liquid is lower at the higher temperature than at the lower temperature.

12. The liquid lens device of claim 10, wherein a motivation for the first liquid and the second liquid to emulsify is reduced at the lower temperature compared to the higher temperature.

13. A method of operating the liquid lens device of claim 10, the method comprising: applying an anti-shock voltage to electrodes in the liquid lens device;
wherein the anti-shock voltage is applied independently of a voltage waveform used to focus the liquid lens device.

14. The method of claim 13, wherein the applying the anti-shock voltage reduces a length of the meniscus, thereby reducing the likelihood of emulsification occurring in response to a shock event.

15. The method of claim 13, comprising:
detecting a shock event; and
applying the anti-shock voltage in response to the detected shock event.

16. The method of claim 13, comprising:
anticipating a shock event; and
applying the anti-shock voltage in response to the anticipated shock event.

17. A method of operating the liquid lens device of claim 10, the method comprising separating an emulsion comprising droplets of one of the first liquid or the second liquid suspended in the other of the first liquid or the second liquid.

18. The method of claim 17, comprising at least one of:
applying a bias voltage to electrodes of the liquid lens device;
applying an oscillating actuation voltage waveform comprising an actuation frequency to the electrodes; or
applying an oscillating excitation voltage waveform comprising an excitation frequency to the electrodes.

19. A method of separating an emulsion within a cavity of a liquid lens device, the method comprising:
applying a waveform to a first liquid and a second liquid within the cavity of the liquid lens device, wherein the application of the waveform causes a pumping action of the first liquid and the second liquid creating turbulence within the cavity thereby effectuating the separating of the emulsion.

* * * * *